United States Patent
Eisenacher et al.

(10) Patent No.: US 9,251,620 B2
(45) Date of Patent: Feb. 2, 2016

(54) FAST PATTERN INTERPOLATION WITH PARALLEL COHERENT RANDOM WALK SEARCHING

(71) Applicant: Disney Enterprises, Inc., Burbank, CA (US)

(72) Inventors: Christian Eisenacher, Burbank, CA (US); Svetlana Akim, Ebelsbach (DE)

(73) Assignee: Disney Enterprises, Inc., Burbank, CA (US)

( * ) Notice: Subject to any disclaimer, the term of this patent is extended or adjusted under 35 U.S.C. 154(b) by 418 days.

(21) Appl. No.: 13/908,969

(22) Filed: Jun. 3, 2013

(65) Prior Publication Data

US 2014/0015828 A1    Jan. 16, 2014

Related U.S. Application Data

(63) Continuation-in-part of application No. 13/281,838, filed on Oct. 26, 2011, now Pat. No. 8,576,239.

(51) Int. Cl.
*G06T 15/04* (2011.01)
*G06T 11/00* (2006.01)

(52) U.S. Cl.
CPC .............. *G06T 15/04* (2013.01); *G06T 11/001* (2013.01)

(58) Field of Classification Search
None
See application file for complete search history.

(56) References Cited

U.S. PATENT DOCUMENTS

| 2002/0140703 | A1* | 10/2002 | Baker | G06T 15/04 345/582 |
|---|---|---|---|---|
| 2003/0164838 | A1* | 9/2003 | Guo | G06T 11/001 345/582 |
| 2004/0212625 | A1* | 10/2004 | Sekine | G06T 15/50 345/582 |
| 2005/0093875 | A1 | 5/2005 | Zhang | |
| 2009/0058871 | A1* | 3/2009 | Mech | G06T 11/001 345/582 |
| 2013/0106890 | A1 | 5/2013 | Eisenacher | |

OTHER PUBLICATIONS

Busto et al., "Instant Texture Synthesis by Numbers", The Eurographics Association, Jan. 1, 2010, 5 Pages.
Saitoh et al., "Transient Texture Synthesis Based on Multiple Templates", Machine Graphics & Vision, Institute of Computer Science, Warsaw, PL, vol. 12, No. 4, Apr. 1, 2003, pp. 525-537.

(Continued)

*Primary Examiner* — Mark Zimmerman
*Assistant Examiner* — Nurun N Flora
(74) *Attorney, Agent, or Firm* — Farjami & Farjami LLP (57) ABSTRACT

There is provided a method and system for fast pattern interpolation with parallel coherent random walk searching. The system includes a system processor and a system memory, and an image processing application stored in the system memory. The image processing application, under control of the system processor, is configured to receive first and second pattern exemplars and a blend map for merging the first and second pattern exemplars, and to utilize a correspondence search process to determine first and second target images for use in producing a composite image. The first and second target images correspond respectively to the first and second pattern exemplars. In addition, a constraint imposed on the correspondence search process by the image processing application is based on the blend map for merging the first and second pattern exemplars.

20 Claims, 6 Drawing Sheets

(56) References Cited

OTHER PUBLICATIONS

Ruiters et al., "Patch-based Texture Interpolation", Computer Graphics Forum, vol. 29, No. 4, Jun. 26, 2010, pp. 1421-1429.

Li-Yi Wei, "Texture Synthesis by Fixed Neighborhood Searching", Internet Citation, Nov. 2001, pp. 1-132, XP002608571, URL: http://www.graphics.stanford.edu/papers/liyiwei_thesis/thesis_1side.pdf [Retrieved on Nov. 8, 2010].

* cited by examiner

FAST PATTERN INTERPOLATION WITH PARALLEL COHERENT RANDOM WALK SEARCHING

RELATED APPLICATIONS

This application is a Continuation-In-Part of patent application Ser. No. 13/281,838, filed Oct. 26, 2011, and titled "Parallel Coherent Random Walk Search for Image Processing," which is hereby incorporated fully by reference into the present application.

BACKGROUND

Example based texture synthesis is one of the most versatile, powerful, and widely used techniques in image processing. A pattern exemplar may be synthesized into a high quality texture of arbitrary size, which may then be utilized for image or video modification, noise reduction, three-dimensional texture mapping, and other image processing tasks.

Example based texture synthesis may also be used to produce texture compositions in which distinct texture patterns are blended using techniques such as texture by numbers (TBN). TBN allows artists to define texture areas so as to produce high quality, visually consistent renderings. However, TBN can only reproduce patterns and transitions among patterns that are present in an exemplar provided as an input to the TBN process. Consequently, an artist must typically prepare not only an input exemplar containing all desired texture patterns, the artist must ensure that all transitions among the patterns in all desired directions are present in the input exemplar as well. Due to the burden imposed by manual preparation of these input exemplars, artists have been reluctant to adopt TBN for synthesis of texture compositions despite its potential advantages.

SUMMARY

There are provided methods and systems for fast pattern interpolation with parallel coherent random walk searching, substantially as shown in and/or described in connection with at least one of the figures, and as set forth more completely in the claims.

BRIEF DESCRIPTION OF THE DRAWINGS

The features and advantages of the present application will become more readily apparent to those ordinarily skilled in the art after reviewing the following detailed description and accompanying drawings, wherein.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, example based texture synthesis may be used to produce texture compositions in which distinct texture patterns are blended using techniques such as texture by numbers (TBN). Despite its potential advantages, TBN can only reproduce patterns and transitions among patterns that are present in an exemplar provided as an input to the TBN process. Consequently, an artist must not only prepare an input exemplar containing all desired texture patterns, all transitions among the patterns in all desired directions must be present in the input exemplar as well. Due to the burden imposed by manual preparation of such input exemplars, artists have been reluctant to adopt TBN for synthesis of texture compositions.

Texture interpolation (hereinafter "texture interpolation" or "TI") techniques capable of producing high quality transitions between different texture patterns automatically do exist. However, conventional texture interpolation solutions either require substantial pre-processing, or are computationally too time consuming to be of practical use to artists, who may wish to create and modify a texture composition in real-time. Moreover, conventional texture interpolation solutions are unable to synthesize texture transitions over arbitrary three-dimensional (3D) surfaces.

The present application discloses methods and systems for fast pattern interpolation with parallel coherent random walk searching. The present solution is capable of producing high quality transitions between image patterns such as textures quickly and automatically, without requiring the substantial and burdensome pre-processing associated with conventional texture interpolation techniques. In addition, the present solution enables synthesis of image patterns and their transitions over arbitrary 3D surfaces. As a result, the present solution may be used to supplement TBN by substantially automating input exemplar preparation. Furthermore, in some instances, the present solution may be used in lieu of a TBN process to produce a desired output texture composition.

It is noted that although the present disclosure often refers to exemplary texture interpolation and texture synthesis processes in the interest of conceptual clarity, the present inventive principles may be applied to image processing more generally. Thus, in some implementations, the present solution may be used to produce texture compositions for use in feature film animation. In other implementations, however, the present concepts may be applied more generally to any pattern interpolation process directed to producing a composite image for use as an input to an image synthesis process, or for producing an output image composition directly.

Figure 1:
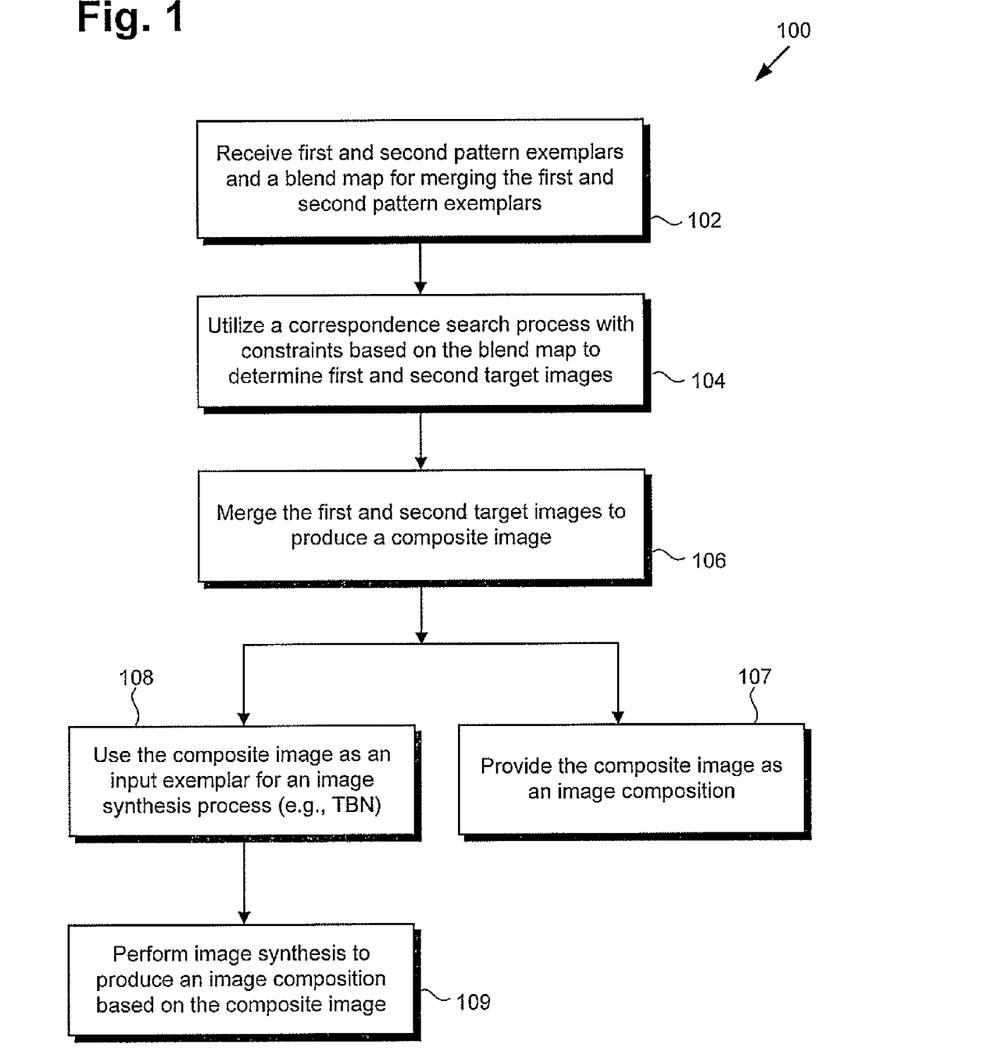
FIG. 1 shows a flowchart describing an exemplary image processing method providing fast pattern interpolation with parallel coherent random walk searching.
Figure 2:
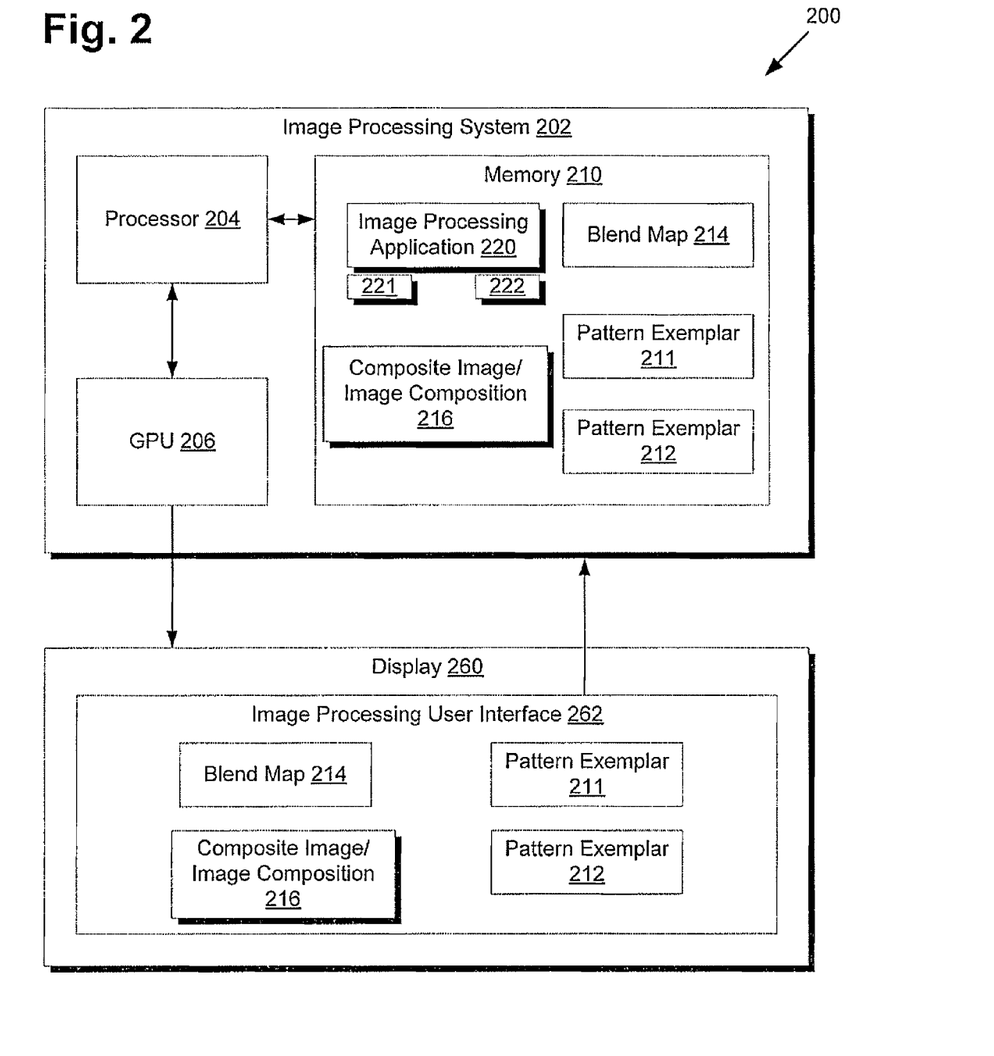
FIG. 2 presents an exemplary image processing system configured to provide fast pattern interpolation with parallel coherent random walk searching.
Figure 3A:
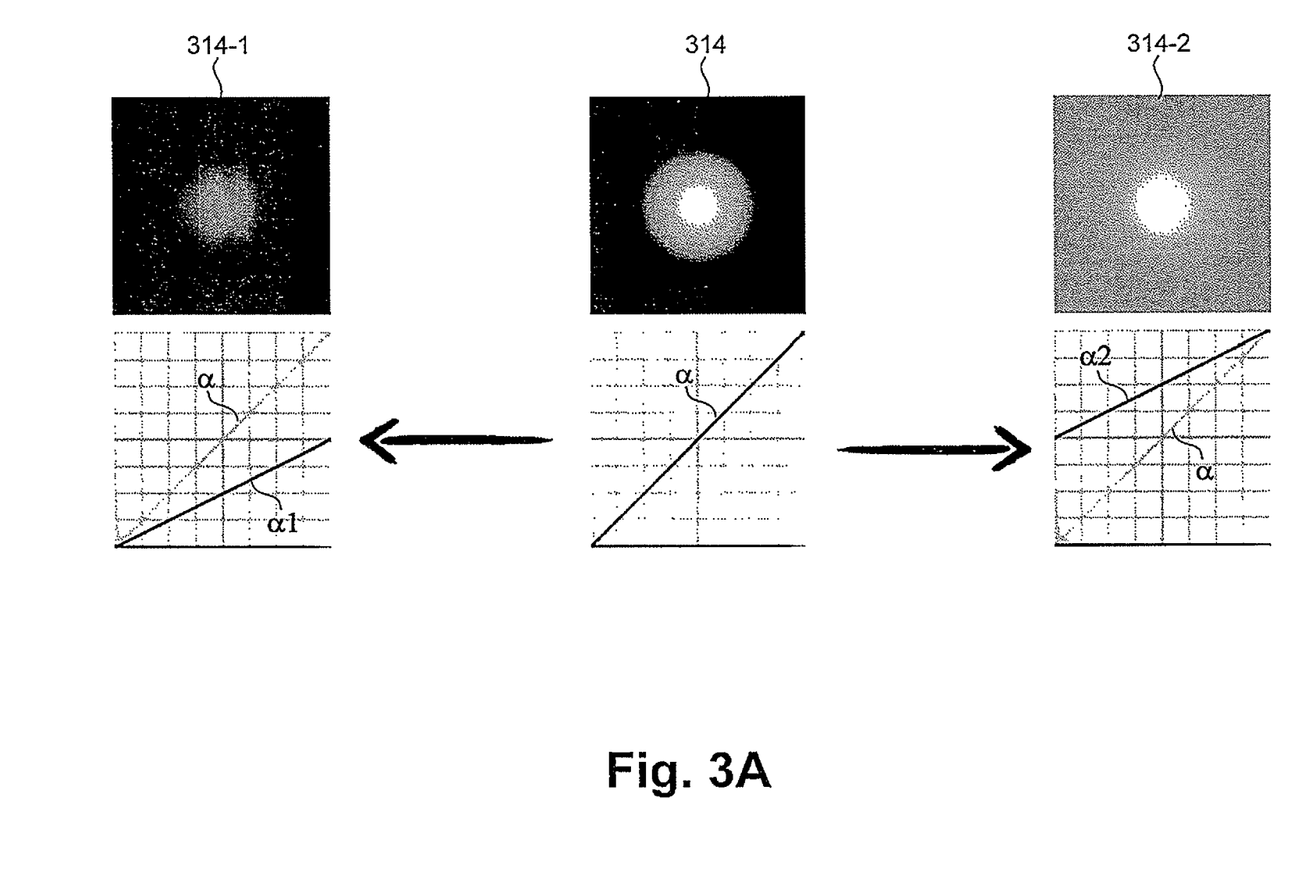
FIG. 3A presents specific examples of weighted blend maps suitable for use in parallel coherent random walk searching, according to one implementation.
Figure 3B:
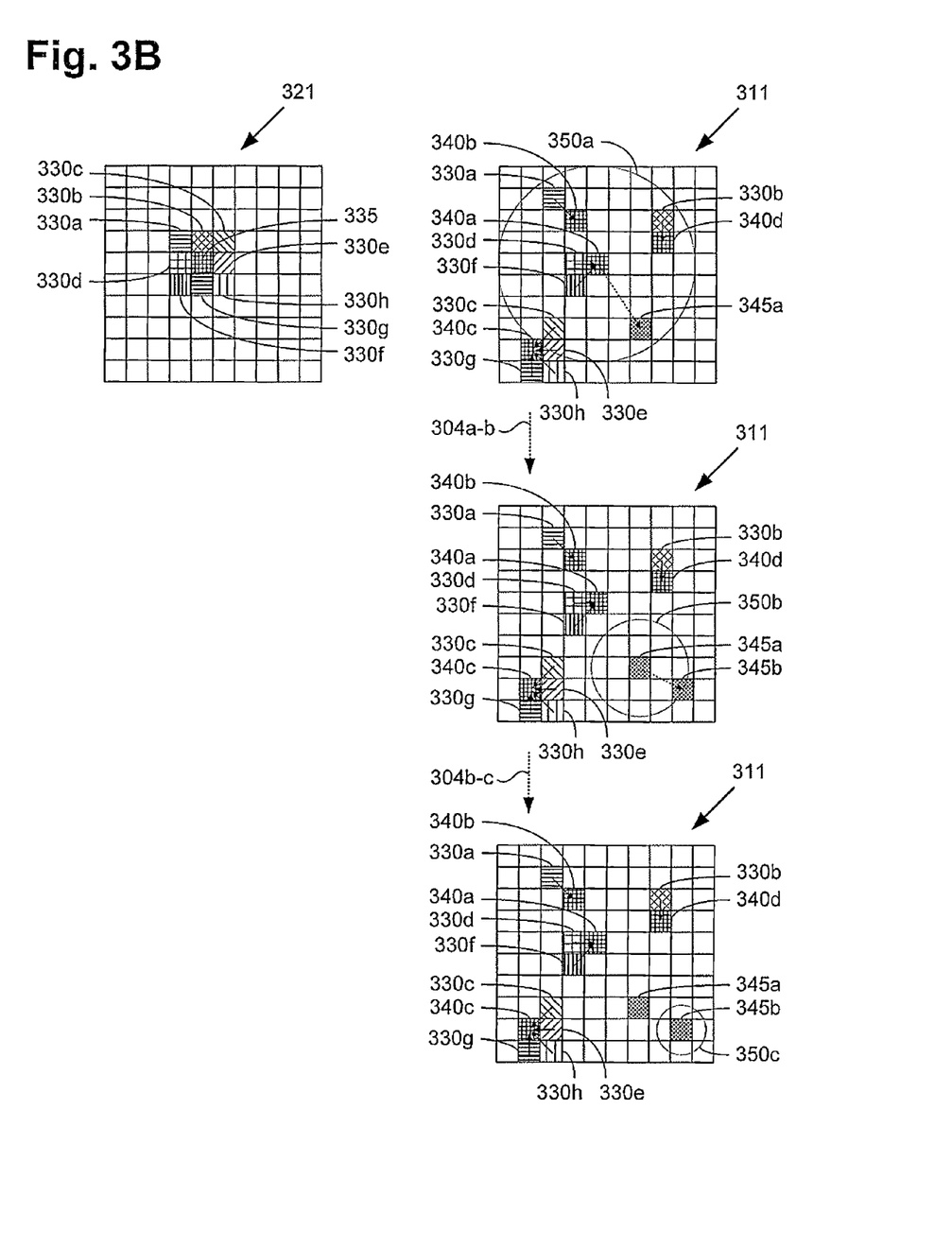
FIG. 3B presents a specific example of parallel coherent random walk searching, according to one implementation.
Figure 4:
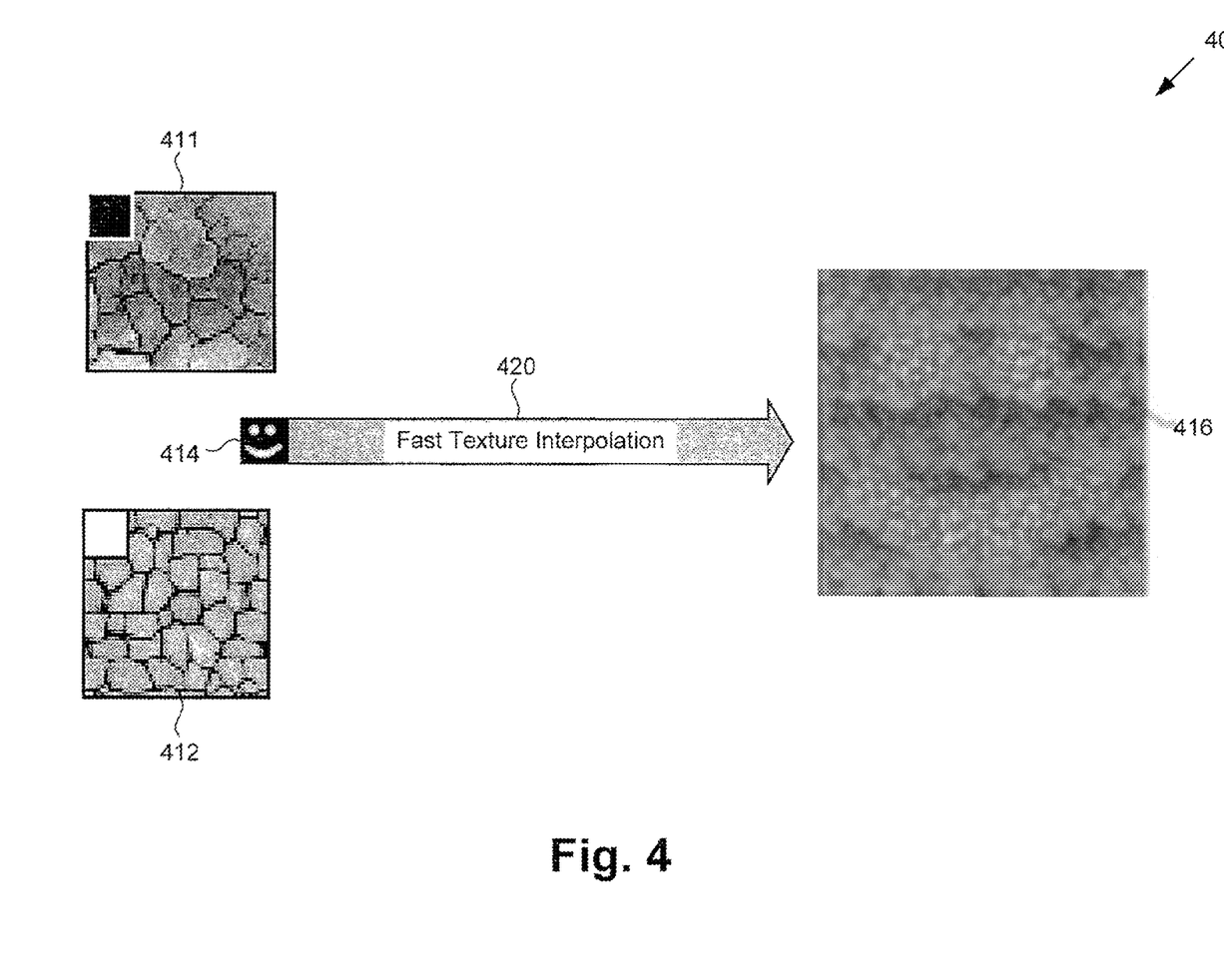
FIG. 4 shows a diagram depicting an exemplary use of fast pattern interpolation with parallel coherent random walk searching to produce a texture composition output.
Figure 5:
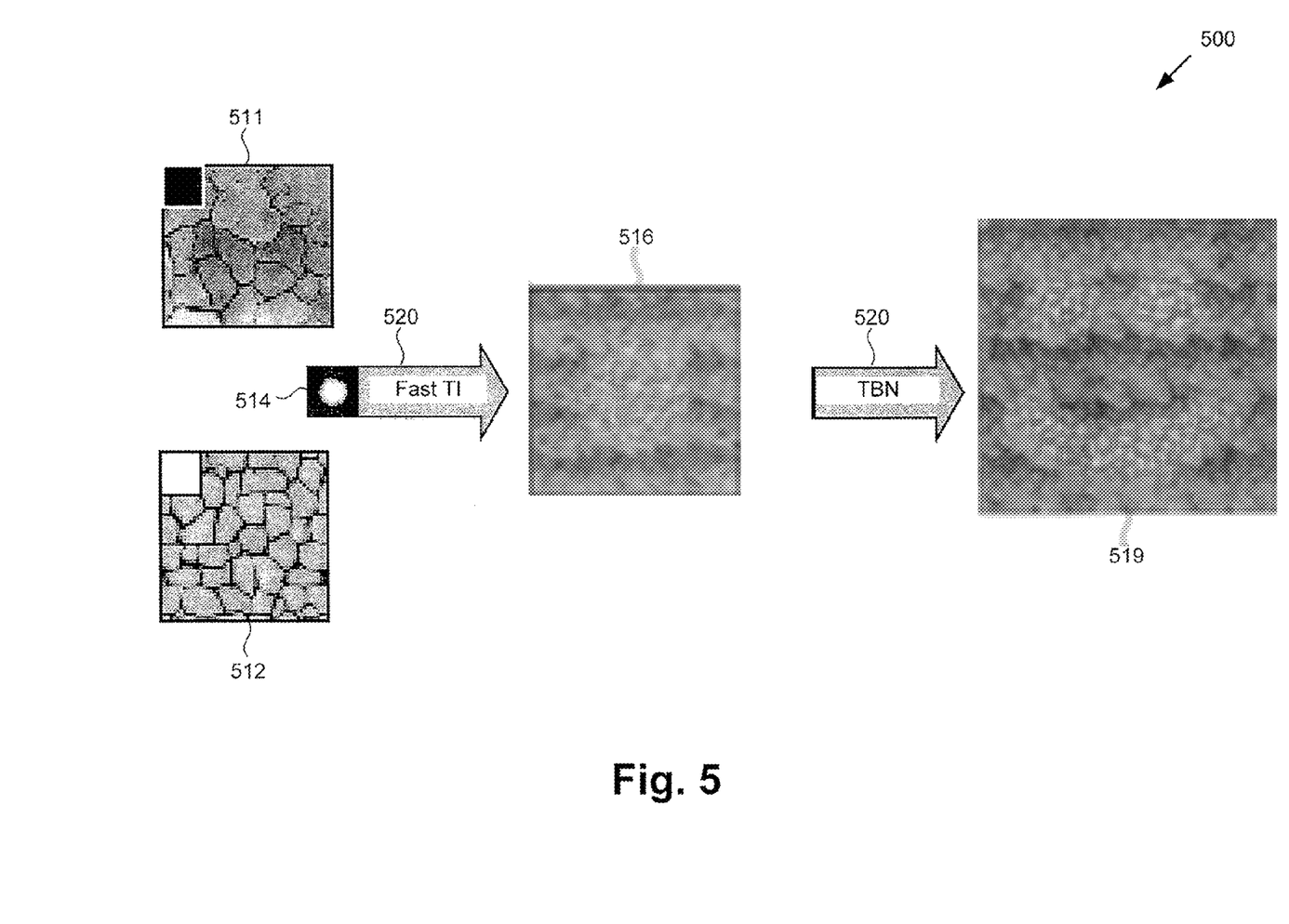
FIG. 5 shows a diagram depicting an exemplary use of fast pattern interpolation with parallel coherent random walk searching to produce a composite image for use as an input exemplar to a texture synthesis process.

FIG. 1 shows flowchart 100 describing an exemplary image processing method providing fast pattern interpolation with parallel coherent random walk searching, according to one implementation. Flowchart 100 will be discussed in conjunction with FIGS. 2, 3A, 3B, 4, and 5. FIG. 2 shows exemplary image processing environment 200 including image processing system 210. FIG. 3A presents specific examples of weighted blend maps suitable for use in parallel coherent random walk searching, while FIG. 3B presents a specific example of parallel coherent random walk searching. FIG. 4 is a diagram depicting an exemplary use of fast pattern interpolation with parallel coherent random walk searching to produce a texture composition as an output. FIG. 5 is a diagram depicting an exemplary use of fast pattern interpolation with parallel coherent random walk searching to produce a composite image for use as an input exemplar to a texture synthesis process. With respect to the method described by flowchart 100, in FIG. 1, is noted that certain details and features have been left out of flowchart 100 in order not to obscure the discussion of the inventive features in the present application.

Referring first to FIGS. 1 and 2, flowchart 100 begins with receiving respective first and second pattern exemplars 211 and 212, and blend map 214 for merging first and second pattern exemplars 211 and 212 (102). Receiving first and second pattern exemplars 211 and 212, and blend map 214 for merging first and second pattern exemplars 211 and 212 may be performed by image processing system 202, using image processing application 220 under the control of system processor 204.

Image processing system 202 may be implemented, for example, as a desktop computer, a laptop computer, a workstation, or a server. As shown in FIG. 2, image processing system 202 includes system processor 204, graphics processing unit (GPU) 206, and system memory 210 storing image processing application 220. System processor 204 may be a multi-core processor configured to execute image processing application 220, as well as to utilize GPU 206 to present image processing user interface 262 to a user or artist (hereinafter "artist") on display 260. The artist may provide, view, and edit pattern exemplar 211, and/or pattern exemplar 212, and/or blend map 214, using image processing user interface 262. Also shown are respective first and second target images 221 and 222 determined using image processing application 220 and utilized by image processing application 220 to produce composite image or image composition 216. As shown in FIG. 2, pattern exemplar 211, pattern exemplar 212, and blend map 214 may be received by image processing system 202 through image processing user interface 262, and may reside in system memory 210.

Flowchart 100 continues with utilizing a correspondence search process with one or more constraints based on blend map 214 to determine first and second target images 221 and 222 (104). Image processing application 220, under the control of system processor 204, is configured to utilize pattern exemplar 211, pattern exemplar 212, and blend map 214 to determine first and second target images 221 and 222. Accordingly, image processing application 220 may perform a correspondence search process as dual parallel coherent random walk searches using pattern exemplar 211, pattern exemplar 212, and blend map 214, to determine target images 221 and 222. The parallel coherent random walk searches may be designed to run as parallel processes on multiple cores of system processor 204 and/or multiple compute units of GPU 206. For example, the correspondence search process may include a first series of parallel coherent random walk searches for determining first target image 221 and a second series of parallel coherent random walk searches for determining second target image 222. Moreover, the first series and the second series of parallel coherent random walk searches may be performed substantially concurrently and in parallel with one another.

In correspondence search processes utilized in texture synthesis, a synthesis result for a pixel or texel may be corrected or improved through neighborhood matching the pixel or texel to the closest candidate in a corresponding pattern exemplar. Implementation of such a search as a parallel process is desirable to efficiently utilize modern multi-core processors and graphics processing units, in order to enable real-time interactive applications such as image or video editing with substantially immediate visual feedback.

According to the present fast pattern interpolation approach, however, the neighborhood used for neighborhood matching is not simply the corresponding neighborhood of the corresponding pattern exemplar. Rather, when correcting a pixel or texel in target image 221, the present solution uses a blend of corresponding neighborhoods from each of pattern exemplars 211 and 212 to generate a blended search neighborhood, which is then used for searching in pattern exemplar 211. Analogously, when correcting a pixel or texel in target image 222, the present solution uses a blend of corresponding neighborhoods from each of pattern exemplars 211 and 212 to generate a blended search neighborhood, which is then used for searching in pattern exemplar 212.

In some implementations, the blending of corresponding neighborhoods from pattern exemplars 211 and 212 may be performed according to substantially the exact blend specified by blend map 214, i.e., the alpha blend, in which case the blended search neighborhoods used to search each of pattern exemplars 211 and 212 will typically be the same. However, in some implementations, it may be advantageous or desirable to further constrain the correspondence search process by modifying the alpha blend to produce a weighted blend favoring the pattern exemplar being searched. For example, when correcting a pixel or texel in target image 221, the blend of corresponding neighborhoods from each of pattern exemplars 211 and 212 may be produced based on blend map 214, but may be weighted in favor of the corresponding neighborhood in pattern exemplar 211 to generate a weighted blended search neighborhood, which is then used for searching in pattern exemplar 211. Analogously, a weighted blended search neighborhood used to correct a pixel or texel in target image 222 may be based on blend map 214, but may be weighted in favor of the corresponding neighborhood in pattern exemplar 212.

Referring to FIG. 3A, FIG. 3A presents specific examples of weighted blend maps suitable for use in parallel coherent random walk searching, according to one implementation. FIG. 3A includes blend map 314 specifying alpha blend "α", and weighted blend maps 314-1 and 314-2, based on blend map 314 but remapping α using a blend parameter beta "β". Blend map 314 corresponds to blend map 214, in FIG. 2.

In view of the discussion above, it is understood that blend map 314 may be used to generate weighted blend map 314-1 for specifying the blending of corresponding neighborhoods from pattern exemplars 211 and 212 when searching pattern exemplar 211 to correct target image 221. Similarly, blend map 314 may used to generate weighted blend map 314-2 for specifying the blending of corresponding neighborhoods from pattern exemplars 211 and 212 when searching pattern exemplar 212 to correct target image 222. The blend parameter β is used to remap α, which ranges from $[0 \ldots 1]$, to α1 ranging from $[0 \ldots \beta]$, and to α2 ranging from $[(\beta-1) \ldots 1]$. It is noted that a value of β=0 corresponds to no blending, i.e., two completely independently determined target images 221 and 222. A value of β=1, by contrast, corresponds to regular α blending according to blend map 314. In many instances a value of approximately β=0.5 may be used advantageously.

Moving to FIG. 3B, FIG. 3B presents a specific example of a correspondence search performed using parallel coherent random walk searching, according to one implementation. Parallel k-coherence is utilized, as known in the art, with k=1, thus minimizing pre-processing by bypassing the calculation of similarity sets while accommodating the use of an appearance space framework for efficient parallel processing. FIG. 3B shows pattern exemplar 311 and target image 321 determined using pattern exemplar 311 at an intermediate stage of pattern interpolation. Pattern exemplar 311 and target image 321 correspond respectively to pattern exemplar 211 and target image 221, in FIG. 2. Although FIG. 3B depicts a parallel coherent random walk search being performed on pattern exemplar 311 to determine target image 321, it is to be understood that an analogous search process may be used to determine a target image corresponding to target image 222 using a pattern exemplar corresponding to pattern exemplar 212. Moreover, such an analogous search process using pattern exemplar 212 to determine target image 222 may be performed in parallel with, and substantially concurrently with, the search process represented in FIG. 3B.

It is noted that FIG. 3B is shown as a simplified example with low-resolution two-dimensional (2D) images. However, in practice, target image 321 may be applied to arbitrary 3D objects and surfaces and may also be much larger in size than pattern exemplar 311. Furthermore, pattern exemplar 311 may include other data besides simple pixel or texel color data, such as coordinates or a multi-dimensional principal components analysis (PCA) projection of neighborhoods from pattern exemplar 311, using an Appearance Space Texture Synthesis (ASIS) framework. For example, the PCA projection may be at least 8 dimensions using at least 5×5 neighborhoods in the input image to provide an information dense appearance space. Thus, in some implementations, the method described by flowchart 100, in FIG. 1, may further include mapping or projecting pattern exemplar 211 and pattern exemplar 212 to a shared appearance space prior to utilizing a correspondence search process to determine target images 221 and 222. Such a mapping or projection of pattern exemplars 211 and 212 to a shared appearance space may be performed by image processing application 220 under the control of system processor 204.

Beginning, for example, with target pixel or texel 335 of target image 321, the 3×3 blended, or weighted and blended, search neighborhood of coherent pixels or texels around target pixel or texel 335 are considered for search, including pixels/texels 330a, 330b, 330c, 330d, 330e, 330f, 330g and 330h. Because k=1 in the present exemplary parallel coherent random walk search, pattern exemplar 311 only includes one matching candidate for each pixel/texel 330a-330h. Thus, candidate 340a, 340b, 340c, and 340d are provided for search. Assuming that candidate 340a is the closest matching candidate, the random search may begin around the position of candidate 340a as the random search center position. Random candidate 345a may then be identified within an initially defined search area 350a around candidate 340a. Although circular search areas are shown in FIG. 3B for simplicity, squares or other shapes may be utilized to define search area 350a in some implementations. Assuming that random candidate 345a is a better match than candidate 340a, the random walk search may reposition itself such that the new random search center position is defined by the position of random candidate 345a in pattern exemplar 311. On the other hand, if random candidate 345a remains the better match, then the search may continue at the same random search center position.

As noted above, pattern exemplar 311 may be transformed using PCA projection to an appearance space. Accordingly, the synthesis of target pixel or texel 335 may be independent of the synthesis state of the other pixels or texels in target image 321. Thus, the described parallel coherent random walk search may be applied in parallel for every pixel or texel in target image 321. As known in the art, rather than processing all pixels or texels in one parallel step, the parallel processing may also be subdivided into sub-groups for improved synthesis quality, and a reduced size run-time neighborhood such as a 4 point neighborhood may be evaluated to accelerate processing speed. An analogous parallel processing can be utilized to determine target image 222 using pattern exemplar 212.

Progressing through search stage 304a-b, and assuming random candidate 345a is chosen as the new present candidate, the random walk search continues with identification of a new random candidate 345b within search area 350b around random candidate 345a. Search area 350b is reduced in size in comparison with search area 350a, for example by reducing a radius of a circular search area by a factor of two, or by reducing a side of a square search area by a factor of two. If random candidate 345b is a closer match than the present candidate, e.g., random candidate 345a, then the random walk search may move the random search center position to the position of random candidate 345b, as shown by search stage 304b-c. Search area 350c is also reduced in size when compared to search area 350b. When the size of a search area, such as search area 350c falls to or below a specified threshold area, the random walk search may stop, and present candidate 345b may be returned as the best candidate for correction of target pixel or texel 335.

After all pixels or texels of target images 221 and 222 are determined and all iterations of parallel processing are completed, flowchart 100, in FIG. 1, continues with synthesizing and merging target images 221 and 222 to produce composite linage/image composition 216 (106). Synthesis and merging of target images 221 and 222 may be performed by image processing application 220 under the control of system processor 204, and using blend map 214. For example, target images 221 and 222 may be synthesized and merged to produce composite image/image composition 216 using the a blending specified by blend map 314, in FIG. 3A.

In some implementations, flowchart 100 may continue with providing composite image/image composition 216 as an image composition (107). Providing composite image/image composition 216 may be performed by image processing system 202 using image processing application 220, image processing user interface 262, and display 260. Referring to FIG. 4, FIG. 4 shows diagram 400 depicting such an implementation. FIG. 4 includes texture exemplar 411, texture exemplar 412, blend map 414, and texture composition 416 produced using fast texture interpolation application 420. Texture exemplar 411, texture exemplar 412, blend map 414, fast texture interpolation application 420, and texture composition 416 correspond respectively to pattern exemplar 211, pattern exemplar 212, blend map 214, image processing application 220, and composite image/image composition 216, in FIG. 2.

According to the implementation depicted by FIG. 4, fast texture interpolation application 420 is configured to produce texture composition 416 using texture exemplar 411, texture exemplar 412, and blend map 414. Although texture composition 416 is shown as a 2D texture composition, fast texture interpolation application 420 may be configured to produce texture composition 416 as a 3D texture suitable for application to a 3D object or surface.

In other implementations, flowchart 100 may include providing composite image 216 to the artist, for example, through image processing user interface 262 on display 260, in FIG. 2. As a result, the artist may use image processing user interface 262 to adjust pattern exemplar 211, and/or pattern exemplar 212, and/or blend map 214 in light of composite image 216. In other words, the present solution enables the artist to apply trial and error adjustment of art direction in real-time.

In some implementations, flowchart 100 may continue with using composite image 216 as an input exemplar for an image synthesis process (108). Moving to FIG. 5, FIG. 5 shows diagram 500 depicting use of composite image 516 as an input exemplar to a TBN texture synthesis process performed by image processing application 520. In addition to composite image 516 and image processing application 520, FIG. 5 includes texture exemplar 511, texture exemplar 512, blend map 514, and texture composition 519 synthesized using a TBN texture synthesis process. Texture exemplar 511, texture exemplar 512, blend map 514, image processing application 520, and composite image 516 correspond respectively to pattern exemplar 211, pattern exemplar 212, blend map 214, image processing application 220, and composite image/image composition 216, in FIG. 2.

Flowchart 100 may conclude with performing image or texture synthesis to produce texture composition 519 based on composite image 516 (109). In some implementations, image or texture synthesis may be performed by image processing application 520. As shown in FIG. 5, for example, image processing application 520 may be configured to synthesize texture composition 519 so as to include a texture pattern corresponding to texture exemplar 511, another texture pattern corresponding to texture exemplar 512, and transitions between those patterns generated in composite image 516 using fast pattern interpolation as disclosed herein. It is reiterated that although texture composition 519 is shown as a 2D texture composition, the present solution is capable of producing texture composition 519 as a 3D texture suitable for application to a 3D object or surface.

Thus, the present application discloses a fast pattern interpolation solution with parallel coherent random walk searching. As described above the present solution is capable of producing high quality transitions between image patterns such as textures quickly and automatically. In addition, by utilizing a pixel or texel centered approach to pattern synthesis, the present solution advantageously enables synthesis of image pattern transitions over arbitrary 3D surfaces. Consequently, the present solution may be used to supplement existing image composition techniques by substantially automating exemplar preparation. Moreover, in some implementations, the present solution may be used to produce a desired output image or texture composition directly.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for image processing, the method comprising:
   receiving first and second pattern exemplars and a blend map for merging the first and second pattern exemplars; and
   utilizing a correspondence search process, including a parallel coherent random walk search, to determine first and second target images for use in producing a composite image, the first and second target images corresponding respectively to the first and second pattern exemplars;
   wherein a constraint imposed on the correspondence search process is based on the blend map for merging the first and second pattern exemplars.

2. The method of claim 1, further comprising merging the first and second target images to produce the composite image.

3. The method of claim 1, wherein the composite image comprises a texture composition.

4. The method of claim 1, further comprising merging the first and second target images to produce the composite image as an input exemplar for use in a texture synthesis process.

5. The method of claim 4, wherein the texture synthesis process is implemented using a texture by numbers (TBN) process.

6. The method of claim 4, further comprising synthesizing a texture composition including a first pattern corresponding to the first pattern exemplar, a second pattern corresponding to the second pattern exemplar, and transitions between the first and second patterns generated in the composite image.

7. The method of claim 1, further comprising synthesizing and merging the first and second target images to produce the composite image on a three-dimensional (3D) surface.

8. The method of claim 1, further comprising mapping the first pattern exemplar and the second pattern exemplar to a shared appearance space prior to utilizing the correspondence search process to determine the first and second target images.

9. A system for performing image processing, the system comprising:
   a system processor and a system memory;
   an image processing application stored in the system memory, the image processing application, under control of the system processor, configured to:
   receive first and second pattern exemplars and a blend map for merging the first and second pattern exemplars; and
   utilize a correspondence search process, a parallel coherent random walk search, to determine first and second target images for use in producing a composite image, the first and second target images corresponding respectively to the first and second pattern exemplars;
   wherein a constraint imposed on the correspondence search process by the image processing application is based on the blend map for merging the first and second pattern exemplars.

10. The system of claim 9, wherein the image processing application is configured to merge the first and second target images to produce the composite image.

11. The system of claim 9, wherein the composite image comprises a texture composition.

12. The system of claim 9, wherein the image, processing application is further configured to merge the first and second target images to produce the composite image as an input exemplar for use in a texture synthesis process.

13. The system of claim 12, wherein the image processing application is further configured to synthesize a texture composition including a first pattern corresponding to the first pattern exemplar, a second pattern corresponding to the second pattern exemplar, and transitions between the first and second patterns generated in the composite image.

14. The system of claim 9, wherein the image processing application is further configured to synthesize and merge the first and second target images to produce the composite image on a three-dimensional (3D) surface.

15. The system of claim 9, wherein the image processing application is further configured to map the first pattern exemplar and the second pattern exemplar to a shared appearance space prior to utilizing the correspondence search process to determine the first and second target images.

16. A non-transitory computer readable memory having an image processing application stored therein for execution by a processor for generating a processed image by a method comprising:
receiving first and second pattern exemplars and a blend map for merging the first and second pattern exemplars; and
utilizing a correspondence search process, including a parallel coherent random walk search, to determine first and second target images for use in producing a composite image, the first and second target images corresponding respectively to the first and second pattern exemplars;
wherein a constraint imposed on the correspondence search process is based on the blend map for merging the first and second pattern exemplars.

17. A method for image processing, the method comprising:
receiving first and second pattern exemplars and a blend map for merging the first and second pattern exemplars; and
utilizing a correspondence search process to determine first and second target images for use in producing a composite image, the first and second target images corresponding respectively to the first and second pattern exemplars;
wherein the correspondence search process includes a first series of parallel coherent random walk searches for determining the first target image and a second series of parallel coherent random walk searches for determining the second target image, the first series and the second series of parallel coherent random walk searches being performed substantially concurrently, and wherein a constraint imposed on the correspondence search process is based on the blend map for merging the first and second pattern exemplars.

18. The method of claim 17 further comprising:
mapping the first pattern exemplar and the second pattern exemplar to a shared appearance space prior to utilizing the correspondence search process to determine the first and second target images; and
merging the first and second target images to produce the composite image.

19. A system for performing image processing, the system comprising:
a system processor and a system memory;
an image processing application stored in the system memory, the image processing application, under control of the system processor, configured to:
receive first and second pattern exemplars and a blend map for merging the first and second pattern exemplars; and
utilize a correspondence search process to determine first and second target images for use in producing a composite image, the first and second target images corresponding respectively to the first and second pattern exemplars;
wherein the correspondence search process utilized by the image processing application includes a first series of parallel coherent random walk searches for determining the first target image and a second series of parallel coherent random walk searches for determining the second target image, the first series and the second series of parallel coherent random walk searches being performed substantially concurrently, and wherein a constraint imposed on the correspondence search process by the image processing application is based on the blend map for merging the first and second pattern exemplars.

20. A non-transitory computer readable memory having an image processing application stored therein for execution by a processor for generating a processed image by a method comprising:
receiving first and second pattern exemplars and a blend map for merging the first and second pattern exemplars; and
utilizing a correspondence search process to determine first and second target images for use in producing a composite image, the first and second target images corresponding respectively to the first and second pattern exemplars;
wherein the correspondence search process includes a first series of parallel coherent random walk searches for determining the first target image and a second series of parallel coherent random walk searches for determining the second target image, the first series and the second series of parallel coherent random walk searches being performed substantially concurrently, and wherein a constraint imposed on the correspondence search process is based on the blend map for merging the first and second pattern exemplars.

* * * * *